Dec. 16, 1952 R. L. TRENT 2,622,211

STABILIZED TRANSISTOR TRIGGER CIRCUIT

Filed April 28, 1951

INVENTOR
R. L. TRENT
BY H. A. Burgess
ATTORNEY

Patented Dec. 16, 1952 2,622,211

UNITED STATES PATENT OFFICE 2,622,211

STABILIZED TRANSISTOR TRIGGER CIRCUIT

Robert L. Trent, Far Hills, N. J., assignor to Bell Telephone Laboratories, Incorporated, New York, N. Y., a corporation of New York Application April 28, 1951, Serial No. 223,522

14 Claims. (Cl. 307—88)

This invention relates to transistor trigger circuits.

It is an object of the invention to achieve reliability and uniformity of operation of transistor trigger circuits under substantially all conditions to be met in actual operation.

It is also an object of the invention to stabilize the triggering requirements of a transistor trigger circuit even though the characteristics of the transistor may change, as for example with temperature or from one transistor to another. A related object is to stabilize the triggering voltage requirements of a transistor trigger circuit without introducing undesirable loading effects on the triggering means.

A more specific object of the invention is to insure that the circuit will become unstable as soon as the emitter current becomes positive and that there will be no intervening stable region.

Transistor trigger circuits may be of several varieties. One group of such circuits employs as its central element a current multiplication transistor as described for example in Patent 2,524,035 to J. Bardeen and W. H. Brattain dated October 3, 1950, and also in an article by R. M. Ryder and R. J. Kircher published in the Bell System Technical Journal for July 1949 (volume 28) at page 367. One of this group comprises a transistor having sources of operating potential connected to its emitter and collector electrodes, a feedback promoting resistor in series with the base electrode, and a "load line" resistor connected to the emitter electrode. In another embodiment, the feedback promoting resistor is connected directly between the emitter and collector electrodes. The current-voltage characteristic of the transistor and its feedback promoting transistor, taken together, has a central negative resistance region bounded on either side by positive resistance regions, the entire characteristic being continuous. The circuit is monostable, astable or bistable, depending usually on whether the load line, that is the characteristic of the resistor and biasing battery connected to the emitter electrode, intersects the current-voltage characteristic in one of its positive resistance parts, in its negative resistance part, or in all three. Trigger circuits of this type may be employed either as two-terminal or as four-terminal networks and may be used for example as single trip (monostable) multivibrators wherein the load line resistor is proportioned to cause the load line to intersect one of the positive resistance parts of the characteristic, or, as a free running (astable) multivibrator wherein the load line resistor is proportioned to intersect the characteristic only in the negative resistance part, or, as a flip-flop (bistable) multivibrator in which case the load line intersects the negative resistance part of the characteristic as well as both positive resistance parts.

Operating experience with such circuits has revealed that their behavior with one transistor at a given temperature may differ widely from their behavior with the same transistor at a different temperature or with another transistor at the same temperature. With a change either in temperature or in the transistor used, a circuit originally monostable, for example, may become either astable or bistable. Further, the amplitude of the pulse required to trigger the circuit may vary widely.

These variations have been traced to the fact that transistors in general vary widely from one to the other and with temperature in the amount of base current which flows when the emitter electrodes are biased negatively with respect to the base for conduction in the reverse direction. These variable base currents flowing through a relatively large feedback promoting resistor connected in the base circuit cause resulting wide variations in the turning point of the characteristic between the negative emitter current positive resistance region and the negative resistance region. Circuital means whereby the effects of these variations may, to a large extent, be eliminated are described in a copending application of A. J. Rack Serial No. 185,041, filed September 15, 1950, which issued as Patent 2,579,336 on December 18, 1951. In accordance with the disclosure therein the large feedback promoting base resistance is, in effect, short circuited whenever the emitter electrode is biased negatively so that variations in base electrode current for a given emitter current will produce no appreciable variations in the voltage measured from the emitter to ground (assuming the end of the feedback resistor remote from the base electrode to be at ground potential). In one embodiment the feedback resistor comprises a current sensitive asymmetrically conducting device such as a point contact rectifier which is biased in its low resistance condition for negative emitter currents but which switches to its high resistance condition for positive emitter currents. The zero emitter current point of the characteristic is thus stabilized as well as the positive resistance characteristic in the negative emitter current region.

Although the zero emitter current point is stabilized, which is desirable in most cases, other effects are introduced which may be undesirable in many applications. The asymmetrical device or diode is initially biased to switch to its high resistance condition substantially at zero emitter current. The diode switches when the base current is sufficient in magnitude to overcome the biasing current which it opposes. But, as previously mentioned, the base current may and usually will vary from transistor to transistor and with temperature so that although initially adjusted to switch to its high resistance condition exactly at zero emitter current, the diode may not switch to its high resistance condition until some small but finite value of positive emitter current is applied. Therefore, not only may the circuit not trigger at zero emitter current but, until the diode becomes a high resistance in the positive emitter current region, the circuit will operate as a normal transistor amplifier and its characteristic will have a positive slope in the positive emitter current region before the negative resistance region is obtained.

This region of positive slope may be undesirable for several reasons. First, it will impose extra loading requirements on the triggering source since, until the diode switches, it will be necessary for the source to drive current into a positive impedance. Secondly, it decreases the stability of the turning point since it will be necessary for the triggering pulse to have sufficient amplitude to drive the emitter voltage not only more positive than the voltage represented by the zero emitter current point but also more positive than the peak voltage of the characteristic at the turning point. This in turn decreases the transition time and hence reduces the limits of high frequency response.

In accordance with the present invention this undesirable region is eliminated by inserting in series with the diode in the base circuit a resistance having a value just greater than the value required to promote instability for positive emitter currents. This resistance is small enough so that undue variations in the zero emitter current point of the characteristic are not introduced but large enough to insure that the circuit will trigger at zero emitter current.

Other features and objects of the invention may be better understood from a consideration of the following detailed description when read in accordance with the attached drawings in which.

Figure 1:
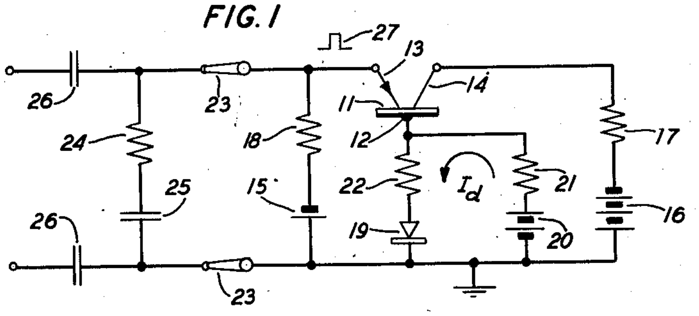
Fig. 1 is a circuit diagram showing schematically a transistor trigger circuit embodying principles of the invention.

Referring now to the drawing, Fig. 1 shows a current multiplication transistor having a semiconductive body 11 with which a base electrode 12 makes ohmic contact while an emitter electrode 13 and a collector electrode 14 make rectifier contact with the surface of the body. A small negative voltage is applied from the battery 15 to the emitter electrode to bias the latter in the reverse direction. A larger negative voltage is applied by the battery 16 to the collector electrode 14 to bias the latter also for conduction in the reverse direction. A resistor 17 from which an output may be taken or which may be included merely to limit the collector current and protect the collector current from damage is connected in the collector circuit. A "load line" resistor 18 which determines the quiescent operating point or points of the circuit is connected in series with the emitter battery 15.

The feedback promoting circuit comprises the resistor 21 which is effectively switched in and out of the base circuit by the asymmetrically conducting device 19, which may, for example, comprise a rectifier of the point contact variety, and which is connected in shunt with resistor 21. Assuming the semiconductive body 11 of the transistor to be of N-type material, the direction of normal current flow in the base-collector circuit is into the base and out of the collector. The rectifier 19 is therefore poled for conduction in the forward direction, or, for easy current flow, in the direction opposite to the direction of the normal current flowing in the base electrode. If the semiconductive body were of P-type material, the rectifier would be poled in the opposite direction to that shown and all biasing batteries would be reversed. A small positive bias is applied to the rectifier 19 by the battery 20 which is connected in series with the resistor 21 so that for negative emitter currents the bias current $I_d$ supplied by the battery 20 will be greater than the normal base electrode current and the rectifier 19 will be in its low resistance condition and effectively switch resistor 21 out of the circuit by shunting the latter with the low forward resistance of the rectifier. For positive emitter currents, however, the normal base electrode current, flowing into the semiconductive body from the base, will be greater than the biasing current and the rectifier 19 will be in its high resistance condition and effectively an open circuit. Resistor 21 is thereby effectively inserted in the base circuit when rectifier 19 is in its high resistance condition and promotes the regenerative feedback and hence the instability which gives rise to the negative resistance region of the circuit current-voltage characteristic.

Figure 2:
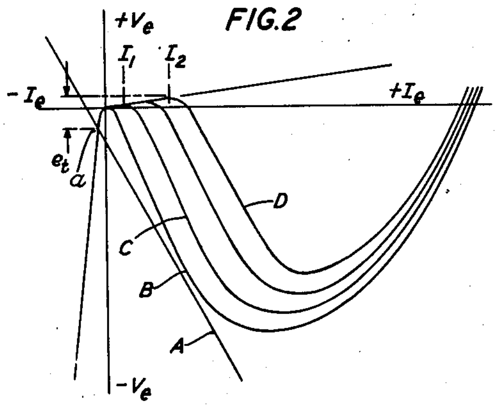
Fig. 2 shows a set of current-voltage characteristics of prior art transistor trigger circuits.

The circuit as thus far described and omitting for the present the resistor 22, is substantially as described in the above-mentioned Rack application and a family of emitter current versus emitter voltage characteristics for this circuit are shown in Fig. 2, the emitter voltage $V_e$ being measured from the emitter electrode to ground. This circuit may be employed in any desired connection. For example, with a load line resistor 18 of magnitude such that the load line, curve A of Fig. 2 intersects the current-voltage characteristics in only one of the positive resistance parts such as at point *a*, a circuit with one stable operating point results. In addition there is shown connectable by way of switches 23 to the input terminals of the circuit above described an input circuit comprising a resistor 24 in series with a condenser 25, the latter being connected in shunt with the trigger circuit. Blocking condensers 26 may be added to prevent the application of improper steady voltages to the emitter electrode 13. With this addition the circuit may be operated as a single trip multivibrator being tripped, for example, by the application of a positive pulse 27 to the emitter electrode 13. The circuit will normally rest in its only stable position which is represented by the intersection of the load line A with the characteristic at point $a$.

The bias current $I_d$ applied to rectifier 19 is initially adjusted for a given transistor at a given temperature so that the normal base electrode current will just overcome this biasing current when the emitter current is equal to zero. The circuit characteristic will then be as illustrated by curve B. However, if the transistor is replaced by another, or if the temperature should change, the base electrode current which flows when the emitter current is equal to zero may vary appreciably so that the normal base electrode current may not be great enough to overcome the biasing current until the emitter current reaches some positive value, for example $I_1$. The circuit characteristic will then be as represented by curve C in Fig. 2. In such a case the triggering pulse must not only have to be of sufficient amplitude to increase the emitter voltage from the value represented by the stable point $a$ to the emitter voltage at the peak of the characteristic, but a positive slope region results between zero emitter current and the positive emitter current $I_1$ at which the rectifier becomes a high resistance. A more extreme case is illustrated by curve D from which it may be seen that an appreciable region of positive slope may result in the positive emitter current region in the vicinity of zero emitter current with variations in the normal base electrode current. As mentioned before this positive slope region may be undesirable since it introduces unwanted loading effects, variations in the triggering requirements and increases the transition time required for triggering. The voltage $e_t$ required to trigger the circuit when operating on characteristic D is indicated on the drawing.

Figure 3:
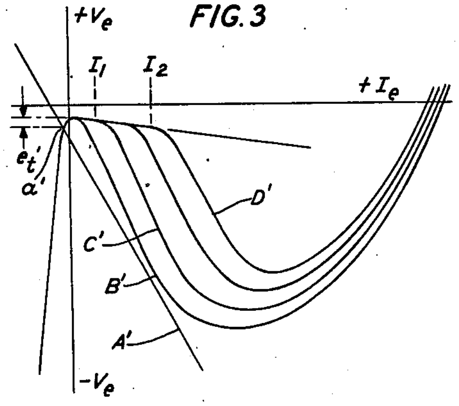
Fig. 3 shows a set of current-voltage characteristics of the circuit shown in Fig. 1.

In accordance with principles of the present invention these undesirable effects may be eliminated by the insertion of a relatively small resistor 22 in series with the base electrode 12 and rectifier 19. This resistor, although small relative to the feedback resistance normally desirable, is sufficiently large so that even though the rectifier 19 is not in its high resistance condition for all positive emitter currents the circuit will be nonetheless unstable to a certain extent and the resultant current voltage characteristics will be as shown by the curves of Fig. 3. The addition of this small resistance will reintroduce a small amount of instability in the zero emitter current point but this will be more than offset by the elimination of the undesired positive slope region. Further, the circuit will trigger in all cases at $V_e=0$ since even though the base current may vary, the peaks of the characteristics will not be displaced—instability resulting as soon as positive emitter current flows. Nor will the small range in variation of the zero emitter current point be any greater than the range of triggering voltages required for circuits whose characteristics are those shown in Fig. 2. It will thus be possible to proportion the load line resistor 18 so that the load line intersects the positive resistance portion of the characteristic quite close to the turning point so that small triggering pulses may be used. Once the emitter current becomes positive the circuit is unstable and even though the rectifier 19 has not switched to its high resistance condition, it will proceed of its own accord to seek a stable point in the higher emitter current positive resistance region. The circuit will thus respond to both shorter and smaller triggering pulses and the triggering source will not be unduly loaded.

The determination of a proper value for resistor 22 requires a balancing of two considerations. First, it is desirable to introduce enough resistance into the base circuit to insure that the circuit will be unstable when the emitter current proceeds positive. An idea of the amount of resistance needed to insure instability may be obtained with the help of the general expression for the emitter voltage-emitter current characteristic, which has been derived in approximate form as follows:

$$V_e=I_e\left[(r_{11}-r_{12})-\frac{(R_b+r_{12})(r_{21}-r_{22}-R_L)}{R_b+R_L+r_{22}}\right]+V_{cc}\left[\frac{R_b+r_{12}}{R_b+R_L+r_{22}}\right]$$

where $r_{11}$, $r_{12}$, $r_{21}$, and $r_{22}$ are the conventional impedance parameters of a four-pole network comprising a transistor, the subscripts "1" denoting the emitter circuit and the subscripts "2" the collector circuit;

$R_b$ is the resistance to be added in the base circuit to promote instability (resistor 22);

$R_L$ is the added resistance in the collector circuit (resistor 17); and $V_{cc}$ is the voltage of the collector supply battery 16.

This equation being of the general form $y=mx+b$, the slope of the characteristic is:

$$m=r_{11}-r_{12}-\frac{(R_b+r_{12})(r_{21}-r_{22}-R_L)}{R_b+R_L+r_{22}}$$

Typical values for the four-pole parameters in the negative resistance region ($I_e>0$) are:

$r_{11}=200$ ohms
$r_{12}=100$ ohms
$r_{21}=50,000$ ohms
$r_{22}=20,000$ ohms

For a negative slope:

$$n(r_{11}-r_{12})\leq\frac{(R_b+r_{12})(r_{21}-r_{22}-R_L)}{R_b+R_L+r_{22}}$$

where $n$ is an integer denoting a factor of safety.

Assuming a factor $n$ of 5 for variation in parameters, substituting and solving for $R_b$, we find a minimum value of $R_b=450$ ohms.

Secondly, the added resistance must not be so large as to introduce too much instability in the turning point, viz, the emitter voltage at zero emitter current. This consideration depends largely on the range of base electrode currents to be expected for zero emitter current which in turn depends on the operating temperatures to be experienced and the normal variations to be expected from one transistor to another. For example, a typical value of base current (and hence, collector current for $I_e=0$) is 1.5 milliamperes. This may be expected to range, however, from 0.25 to 3.0 milliamperes. The turning point with a base resistor of 450 ohms would therefore vary 1.25 volts, which is practically negligible. Resistor 22 could therefore be as large as 2000 ohms or more without introducing undue stability in the turning point. This is still considerably smaller than the feedback resistance which is required to promote the desired amount of feedback over the negative resistance region as a whole, for example, 10,000 ohms will be necessary in many applications to achieve proper characteristics. The latter resistance would cause the turning point to vary 27.5 volts with the illustrative range of base currents to be expected. It may therefore be seen that the combination of a current-controlled resistance element plus a small fixed resistance in the base circuit permits stabilization of the turning point and hence triggering requirements without introducing unwanted loading effects. With this combination, the load line resistor may be proportioned to intersect the characteristic in Fig. 3 at a point $a'$ just below its peak at the voltage coordinate, allowing only for the small variations to be expected in the base current, as previously mentioned. The small displacement of the characteristics when the rectifier 19 is in its low resistance condition and which these variations induce has not been shown in Fig. 3 since in most applications they will be negligible.

The curves of Fig. 3 illustrate the features above mentioned; the curves of Fig. 2 are those of a circuit according to Fig. 1 with resistor 22 omitted, while those of Fig. 3 include the effect of this resistor. For example, with a circuit having the characteristic D′ and with a load line A′, the circuit will trigger with an input pulse of voltage $e_t'$ and will become unstable as soon as positive emitter current begins to flow, even though the rectifier 19 does not become a high resistance until the emitter current reaches a value of $I_2$. In fact, the circuit will trigger with an input of $e_t'$ regardless of the characteristic on which it is operating.

Since the base current flowing at zero emitter current $I_{co}$ increases with increases in temperature, a further improvement may be obtained by replacing the resistor 21 with a thermistor whose resistance decreases with increases in temperature. Then as the temperature and $I_{co}$ increase, the bias $I_d$ will also increase, which, on the characteristics of Fig. 3 will move the points or currents at which the circuit switches to the high negative resistance towards the ordinate. This permits lowering the initial biasing current $I_d$ by a factor of about one-third by allowing the thermistor to compensate for temperature variations. The resistor 22 will still be desirable however to insure instability as soon as the emitter current becomes positive.

Figure 4:
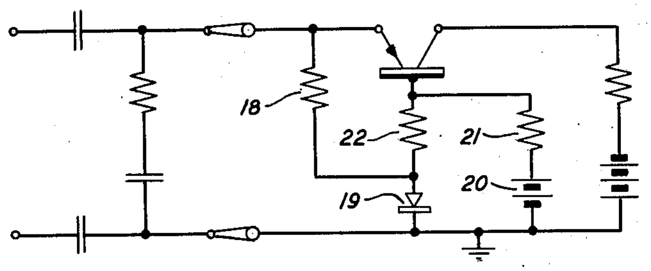
Fig. 4 is a circuit diagram illustrating schematically another embodiment of the invention which permits the elimination of a separate source of emitter operating potential.

An additional feature of the present invention is illustrated by the circuit shown in Fig. 4. As therein shown, a separate battery to supply operating potential to the emitter electrode may be omitted; and, instead, this potential may be supplied by the battery 20 by connecting the end of the load line resistor 18 remote from the emitter to a point between resistor 22 and the rectifier 19. With this circuit proper operating potential is supplied to the emitter electrode by proper proportioning of resistors 22 and 18. Further the triggering point may be set as close as desired to the turn-over point by proper proportioning of the voltage of battery 20 and the resistance of resistor 22. As with the circuit of Fig. 1, the circuit will be held stable in the negative emitter current region for all values of base current variations that the stabilization feature has been designed to accommodate.

Figure 5:
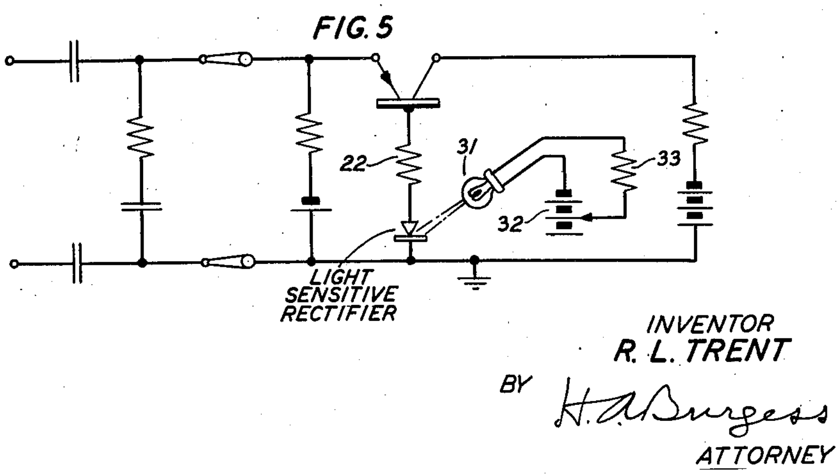
Fig. 5 illustrates the use of a light sensitive diode in a trigger circuit embodying principles of the invention.

A light sensitive rectifier may be used in the base circuit as is shown in Fig. 5. Light sensitive diodes are described for example in Patent 2,402,662 to R. S. Ohl dated June 25, 1946. Light sensitive diodes have higher resistances in their high resistance condition than do ordinary point contact rectifiers so that their use increases the slope in the negative resistance region and hence permits higher frequency response by decreasing the time necessary for the circuit to progress from one stable condition to another. Further, the full value of the resistance of the rectifier in its high resistance condition is realized due to the elimination of the shunting effects produced by the biasing battery 20 and resistor 21 of Figs. 1 and 4. Bias is supplied to the diode by the light source 31 which is supplied by a variable battery 32 connected in series with a resistor 33. The light bias determines the current at which the rectifier changes from a high to low resistance, and vice versa. This circuit in other respects is the same as the one presented in Fig. 1.

Although the invention has been described as relating to specific embodiments and although several specific circuit parameters have been mentioned, the invention should not be deemed limited to these embodiments or circuit values since other embodiments will readily occur to those skilled in the art, and the use of specific parameters was only by way of example.

What is claimed is:

1. The combination with a transistor trigger circuit comprising a transistor having an emitter electrode, a collector electrode, and a base electrode, an asymmetrically conducting device connected to said base electrode and poled for conduction in the forward direction in the direction opposite to the direction of normal base current, a first circuit including said emitter electrode, said asymmetric device and said base electrode, a second circuit including said collector electrode, said asymmetric device and said base electrode, and means to apply a biasing current to said asymmetric device, of a resistance element connected in series with said asymmetric device and having a value of resistance only slightly greater than the value required to promote instability for positive emitter currents.

2. A trigger circuit comprising a transistor having an emitter electrode, a collector electrode, and a base electrode, a variable resistance element connected in series with said base electrode and controllable in response to the current flowing in said base electrode, said resistance element proportioned to have a value of resistance substantially greater than the value required to promote instability over at least a range of said base electrode current, an emitter circuit and a collector circuit each including said controllable resistance element, and a fixed resistance element connected in series with said controllable element and having a value slightly greater than the said value required to promote instability.

3. The combination according to claim 2 and means to apply input pulses to said emitter circuit.

4. The combination according to claim 2, wherein said emitter circuit and said collector circuit each include a source of operating potential.

5. A trigger circuit comprising a transistor having an emitter electrode, a collector electrode, and a base electrode, an emitter circuit and a collector circuit, said last two named circuits having, in common, feedback promoting means comprising an asymmetrically conducting device poled for conduction in the forward direction in the direction opposite to that of normal collector current flow, a first resistance element connected in series with said asymmetric device and having a value slightly greater than the value necessary to promote instability for positive emitter currents but substantially smaller than the value required to give the trigger circuit the normally desirable negative resistance characteristic, and a second resistance element connected in shunt with said first resistance element and said asymmetric device and having a value substantially greater than the value of said first resistance element and approximately equal to the said value required for the normally desirable negative resistance characteristic.

6. The combination in accordance with claim 5 and means connected in series with said second resistance element to apply a biasing current to said asymmetrically conducting device.

7. The combination in accordance with claim 5 and means to apply input pulses to said emitter electrode.

8. The combination in accordance with claim 5 wherein said emitter circuit includes a load line resistor.

9. A trigger circuit comprising a transistor having an emitter electrode, a collector electrode, and a base electrode, a base circuit including, in series, said base electrode, a first fixed resistance element, and a current-controlled resistance element, an emitter-base circuit and a collector-base circuit each including said first and said current-controlled resistance elements, a source of potential for supplying a biasing current to said current-controlled element shunting said first and said current-controlled resistance elements, a second fixed resistance element connected in series with said source, and a load line resistor connected between said emitter electrode and the junction of said first and said current-controlled resistance elements, said second resistance element being substantially larger than said first resistance element.

10. The combination in accordance with claim 9, wherein said current-controlled resistance element comprises a rectifying element.

11. The combination in accordance with claim 9, wherein said fixed resistance element has a value slightly greater than the value required to promote instability for positive emitter currents.

12. The combination with a transistor trigger circuit comprising a transistor having an emitter electrode, a collector electrode, and a base electrode, a current-controlled asymmetrically conducting device connected in series with said base electrode and poled for conduction in the forward direction in the direction opposite to the direction of normal base current, an emitter-base circuit including said asymmetric device and a collector-base circuit including said asymmetric device, of an element having a resistance $R_b$ connected in series with said asymmetric device and having a value equal to or slightly greater than the minimum value required to satisfy the following relation:

$$n(r_{11}-r_{12}) \leq \frac{(R_b+r_{12})(r_{21}-r_{22}-R_L)}{R_b+R_L+r_{22}}$$

where:

$n$ is a factor of safety to allow for normal variation in transistor parameters;

$r_{11}$, $r_{12}$, $r_{21}$ and $r_{22}$ are the impedance parameters of a four-pole network comprising a transistor, the subscripts "1" denoting the emitter circuit and the subscripts "2" the collector circuit; and, $R_L$ is the external resistance connected to the collector circuit.

13. In combination, a transistor trigger circuit comprising a transistor having an emitter electrode, a base electrode, and a collector electrode and having a negative resistance characteristic promoted by a current responsive feedback circuit connected in a common branch of an emitter-base circuit and a collector-base circuit, said feedback circuit being effective as a high resistance substantially greater than the value required to promote said negative resistance characteristic in response to currents in said emitter-base circuit of a first direction and effective as a low resistance substantially lower than said value in response to currents in said emitter-base circuit of the opposite direction, and a resistor having a value only slightly greater than said value connected in said feedback circuit.

14. A trigger circuit comprising a transistor having an emitter electrode, a base electrode, and a collector electrode; a point of reference potential; a first circuit connecting said emitter electrode to said point, a second circuit connecting said base electrode to said point, and a third circuit connecting said collector electrode to said point; said second circuit comprising a first resistor of relatively large value shunted by a second resistor of relatively low value in series with an asymmetrically conducting impedance element poled for conduction in the forward direction in the direction opposite to that of normal base current flow, the resistance of said second resistor being at least as great as the value necessary to promote instability.

ROBERT L. TRENT.

No references cited.